(12) United States Patent
Prushinskiy et al.

(10) Patent No.: US 9,146,638 B2
(45) Date of Patent: Sep. 29, 2015

(54) ELECTRONIC DEVICE, UNLOCKING METHOD THEREOF, AND ZOOMING AND TOGGLING CONTROL METHOD THEREOF

(71) Applicant: Samsung Display Co., Ltd., Yongin, Gyeonggi-Do (KR)

(72) Inventors: Valeriy Prushinskiy, Hwaseong-si (KR); Minsoo Kim, Yongin (KR); Wonsik Hyun, Yongin (KR); Mu Gyeom Kim, Yongin (KR); Kee Hyun Nam, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 47 days.

(21) Appl. No.: 14/062,034

(22) Filed: Oct. 24, 2013

(65) Prior Publication Data
US 2014/0347286 A1   Nov. 27, 2014

(30) Foreign Application Priority Data

May 23, 2013   (KR) .................. 10-2013-0058597

(51) Int. Cl.
*G06F 3/041* (2006.01)
*G06F 1/16* (2006.01)
*H04M 1/02* (2006.01)
*G02F 1/1333* (2006.01)

(52) U.S. Cl.
CPC ............ *G06F 3/0416* (2013.01); *G06F 1/1652* (2013.01); *G06F 3/0412* (2013.01); *H04M 1/0268* (2013.01); *G02F 1/133305* (2013.01); *G06F 2203/04102* (2013.01); *H04M 2250/22* (2013.01)

(58) Field of Classification Search
CPC ......... G06F 3/044; G06F 3/045; G06F 3/041; G06F 3/0412; G06F 1/1652; G06F 1/1626; G06F 2203/04102; G06F 3/0414; G06F 3/0416; H04M 1/0268; H04M 2250/22; G02F 1/133305
See application file for complete search history.

(56) References Cited

U.S. PATENT DOCUMENTS 6,943,773 B2 *   9/2005   Wong et al. .................... 345/156
7,443,380 B2 *   10/2008   Nozawa ........................ 345/156

(Continued)

FOREIGN PATENT DOCUMENTS

EP   2458829 A2   5/2012
EP   2508960 A2   10/2012

(Continued)

OTHER PUBLICATIONS

Follmer et al., "Jamming User Interfaces: Programmable Particle Stiffness and Sensing for Malleable and Shape-Changing Devices",, Proceedings of the 25th Annual ACM Symposium on User Interface Software and Technology, UIST'12, Oct. 7, 2012, pp. 519.

*Primary Examiner* — Priyank Shah
(74) *Attorney, Agent, or Firm* — Cantor Colburn LLP

(57) ABSTRACT

An electronic device includes a flexible touch screen including a display unit configured to display an image and a bending unit configured to sense a user bending input and a body part disposed below the flexible touch screen and including a controller configured to control a transition from a lock state to an unlock state of the flexible touch screen based on the user bending input and a memory configured to store a predefined bending action used to transition from the lock state to the unlock state of the flexible touch screen.

17 Claims, 16 Drawing Sheets

(56) References Cited

U.S. PATENT DOCUMENTS

| | | | |
|---|---|---|---|
| 2003/0076343 A1* | 4/2003 | Fishkin et al. | 345/701 |
| 2004/0008191 A1* | 1/2004 | Poupyrev et al. | 345/184 |
| 2006/0274036 A1* | 12/2006 | Hioki et al. | 345/156 |
| 2009/0241072 A1 | 9/2009 | Chaudhri et al. | |
| 2010/0117975 A1* | 5/2010 | Cho | 345/173 |
| 2010/0164888 A1* | 7/2010 | Okumura et al. | 345/173 |
| 2011/0117970 A1 | 5/2011 | Choi | |
| 2011/0167391 A1* | 7/2011 | Momeyer et al. | 715/863 |
| 2011/0298691 A1 | 12/2011 | DeLuca et al. | |
| 2012/0133621 A1* | 5/2012 | Kim | 345/204 |
| 2013/0002133 A1* | 1/2013 | Jin et al. | 313/511 |
| 2013/0010405 A1 | 1/2013 | Rothkopf et al. | |
| 2013/0083496 A1* | 4/2013 | Franklin et al. | 361/749 |
| 2014/0004906 A1* | 1/2014 | Chi et al. | 455/566 |
| 2014/0055702 A1* | 2/2014 | Park et al. | 349/43 |
| 2014/0062976 A1* | 3/2014 | Park et al. | 345/204 |

FOREIGN PATENT DOCUMENTS

| | | |
|---|---|---|
| EP | 2660678 A1 | 11/2013 |
| KR | 1020090120599 A | 11/2009 |
| KR | 1020100050318 A | 5/2010 |
| KR | 1020100052227 A | 5/2010 |
| KR | 1020110010523 A | 2/2011 |
| KR | 1020110055137 A | 5/2011 |
| KR | 1020110068666 A | 6/2011 |
| KR | 1020130007311 A | 1/2013 |

* cited by examiner

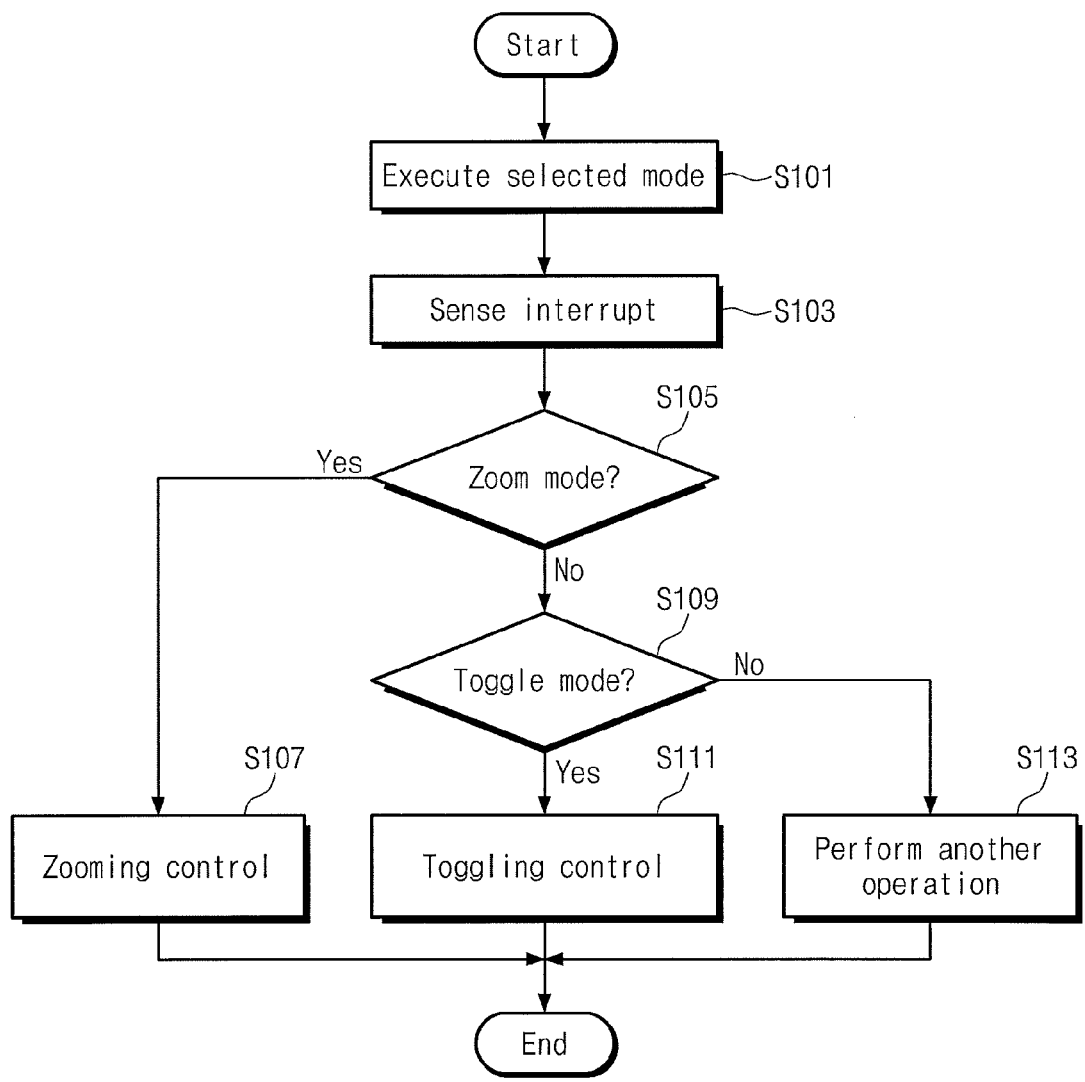

ELECTRONIC DEVICE, UNLOCKING METHOD THEREOF, AND ZOOMING AND TOGGLING CONTROL METHOD THEREOF

This application claims priority to Korean Patent Application No. 10-2013-0058597, filed on May 23, 2013, and all the benefits accruing therefrom under 35 U.S.C §119, the entirety of which is hereby incorporated by reference.

BACKGROUND (1) Field

Exemplary embodiments of the invention relate to electronic devices, unlocking methods thereof and zooming and toggling control methods thereof. More particularly, exemplary embodiments of the invention are directed to an electronic device capable of performing an unlocking, zooming and toggling operation using a bending action.

(2) Description of the Related Art

In recent, electronic devices such as a handheld terminal have become daily necessities of modern people. Such an electronic device generally includes a touch screen that displays graphics and text while sensing touches.

In a typical electronic device employing a touch screen, locking and unlocking functions are implemented to effectively prevent a touch error. As an exemplary embodiment of locking and unlocking functions, a touch screen displays a guide image for transition from a lock state to an unlock state and, after touching a handler included in the guide image, a user performs a moving operation in the guided direction to unlock the electronic device.

Flexible touch screens, which are bendable due to use of a flexible substrate, are under development. Since flexible touch screens are advantageous in easy deformation, various studies have been conducted to employ the flexible touch screens for next-generation electronic devices.

SUMMARY

Exemplary embodiments of the invention provide an electronic device, an unlock method of the electronic device, and a zooming and toggling method of the electronic device.

An electronic device according to an exemplary embodiment of the invention may include a flexible touch screen and a body part. The flexible touch screen and the body part may be flexible and include a substantially flat shape.

In an exemplary embodiment, the flexible touch screen may include a display unit configured to display an image and a bending unit configured to sense a user bending input.

In an exemplary embodiment, the body part may include a controller configured to control a transition from a lock state to an unlock state of the flexible touch screen based on the user bending input and a memory configured to store a predefined bending action used to transition from the lock state to the unlock state of the flexible touch screen.

In an exemplary embodiment, the predefined bending action may include at least one of bending one side of the flexible touch screen and bending opposite sides of the flexible touch screen.

In an exemplary embodiment, the predefined bending action may include at least one of bending the flexible touch screen once and bending the flexible touch screen two or more times. Bending the flexible touch screen two or more times may include at least one of bending the flexible touch screen two or more times in the same direction and bending the flexible touch screen two or more times in different directions.

In an exemplary embodiment, the predefined bending action may include at least one of concavely bending the flexible touch screen and convexly bending the flexible touch screen.

An electronic device according to another exemplary embodiment of the invention may include a flexible touch screen and a body part. The flexible touch screen is flexible, while the body part is not flexible.

In an exemplary embodiment, at least one side of a top surface of the body part may be spaced apart from the flexible touch screen in a thickness direction. The flexible touch screen may have a flat shape, and the at least one side of the top surface of the body part may be curved.

An electronic device according to another exemplary embodiment of the invention may include a flexible touch screen and a body part. The flexible touch screen is flexible, while the body part is not flexible.

In an exemplary embodiment, at least one side of a top surface of the body part may be spaced apart from the flexible touch screen in a width or length direction. The at least one side of the top surface of the body part may be curved, and at least one side of the flexible touch screen corresponding to the least one side of the top surface of the body part may be curved along the least one side of the top surface of the body part.

An unlock method of an electronic device according to an exemplary embodiment of the invention may include setting an electronic device including a flexible touch screen to a lock state; detecting bending of the flexible touch screen; transitioning the electronic device to an unlock state when the detected bending corresponds to an unlock action; and maintaining the electronic device in a lock state when the detected bending does not correspond to the unlock action.

A zooming and toggling control method of an electronic device according to an exemplary embodiment of the invention may include displaying a target image on an electronic device including a flexible touch screen; sensing occurrence of an interrupt that is an action to bend the flexible touch screen; determining whether the interrupt requests a zoom mode; determining whether the interrupt request a toggle mode; performing zooming control on the target image when the interrupt request the zoom mode; and performing toggling control on the target image when the interrupt request the toggle mode.

BRIEF DESCRIPTION OF THE DRAWINGS

FIG. 7 is a flowchart illustrating a zooming control method based on a bending action in an electronic device according to exemplary embodiments of the invention.

DETAILED DESCRIPTION

Figure 1:
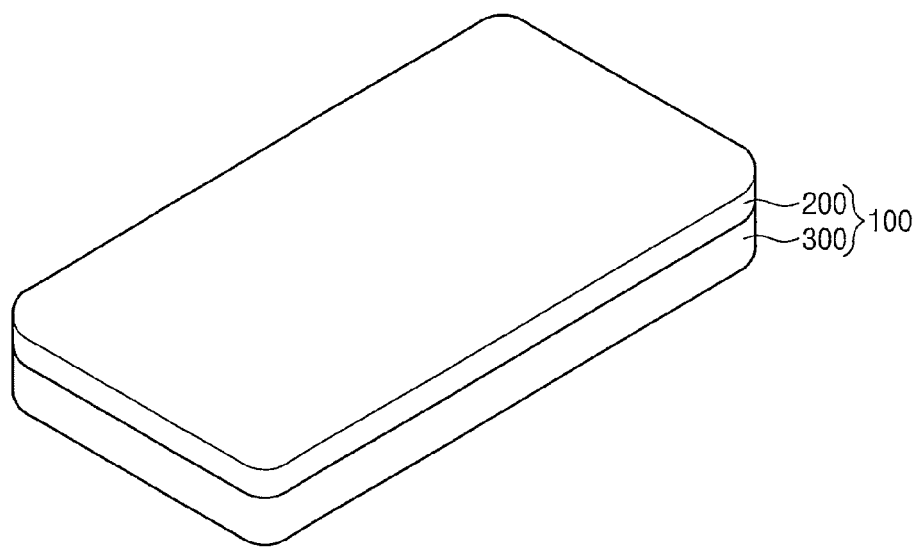
FIG. 1 is a perspective view of an electronic device according to an exemplary embodiment of the invention.

The advantages and features of the invention and methods of achieving them will be apparent from the following exemplary embodiments that will be described in more detail with reference to the accompanying drawings. It should be noted, however, that the invention is not limited to the following exemplary embodiments, and may be implemented in various forms. Accordingly, the exemplary embodiments are provided only to disclose examples of the invention and to let those skilled in the art understand the nature of the invention.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Figure 2:
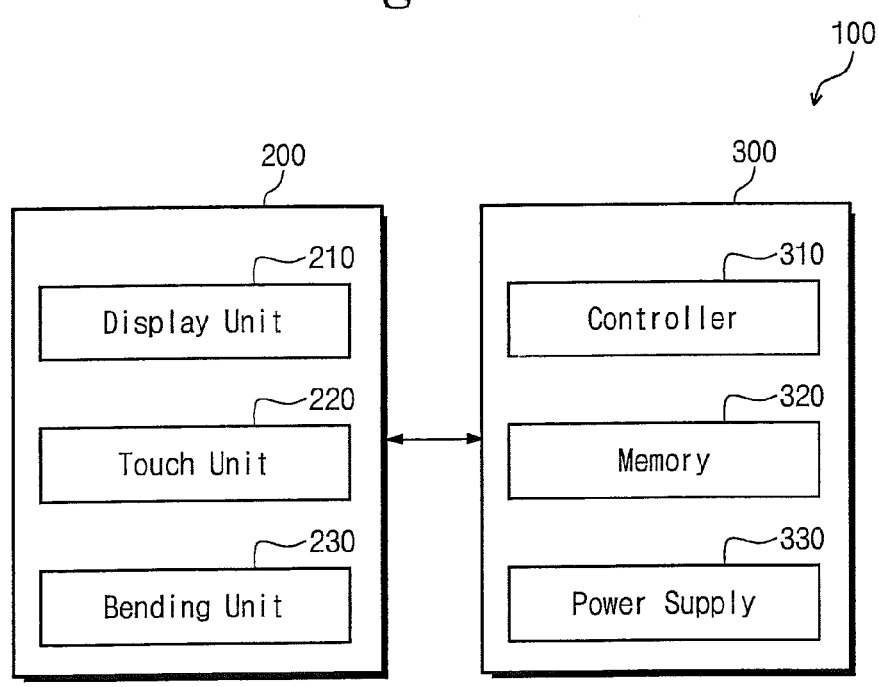
FIG. 2 is a block diagram of the electronic device in FIG. 1.

FIG. 1 is a perspective view of an electronic device 100 according to an exemplary embodiment of the invention, and FIG. 2 is a block diagram of the electronic device 100.

The electronic device 100 may have a plurality of user interface states. A user interface state is a state in which the electronic device 100 responds in a predefined manner to user input. In some exemplary embodiments, the plurality of user interface states includes a user-interface lock state and a user-interface unlock state. In some exemplary embodiments, the plurality of user interface states includes states for a plurality of applications.

In the user-interface lock state (hereinafter referred to as "lock state"), the electronic device 100 is powered on and operational but ignores most, if not all, user input. That is, the electronic device 100 takes no action in response to user input and/or the electronic device 100 is effectively prevented from performing a predefined set of operations in response to the user input. The predefined set of operations may include navigation between user interfaces and activation or deactivation of a predefined set of functions. The lock state may be used to effectively prevent unintentional or unauthorized use of the electronic device 100 or activation or deactivation of functions on the electronic device 100. When the electronic device 100 is in the lock state, the electronic device 100 may be said to be locked. The electronic device 100 that is in the locked state may be described as a locked device 100. In some exemplary embodiments, the electronic device 100 in the lock state may respond to a limited set of user inputs, including input that corresponds to an attempt to transition the electronic device 100 to the user-interface unlock state or input that corresponds to power the electronic device 100 off. In other words, the locked device 100 responds to user input corresponding to attempts to transition the electronic device 100 to the user-interface unlock state or power the electronic device 100 off, but does not respond to user input corresponding to attempts to navigate between user interfaces.

In the user-interface unlock state (hereinafter referred to as "unlock state"), the electronic device 100 is in its normal operating state, detecting and responding to user input corresponding to interaction with the user interface. The electronic device 100 that is in the unlock state may be described as an unlocked device 100. An unlocked device 100 detects and responds to user input for navigating between user interfaces, entry of data and activation or deactivation of functions.

The electronic device 100 may include various types of information, communication and multimedia devices such as a mobile terminal, a handheld computer, a tablet computer, a portable multimedia player ("PMP"), a personal digital assistant ("PDA"), a smart phone and an MP3 player, for example, but is not limited thereto.

The electronic device 100 may include a flexible touch screen 200 and a flexible body part 300.

In an exemplary embodiment, while the electronic device 100 is in the lock state, the flexible touch screen 200 is inhibited from responding to touch and bending. At this point, the flexible touch screen 200 operates in the lock state. In an exemplary embodiment, the flexible touch screen 200 may still respond to the touch and bending within a limited range during the lock state of the electronic device 100. The limited range includes touch and bending corresponding to a trial to allow the electronic device 100 to transition to a user interface unlock state.

While the electronic device 100 is an unlock state, the flexible touch screen 200 detects and responds touch and bending corresponding to navigation between user interfaces, entry of data and activation or deactivation of functions. At this point, the flexible touch screen 200 operates in the unlock state.

In FIG. 1, there is shown an exemplary embodiment where the flexible touch screen 200 has a shape of rectangle having a pair of long sides and a pair of short sides in a plane view and is provided in a form of a flat plate when no force is applied to the flexible touch screen 200.

Hereinafter, a horizontal direction will be defined as an extending direction of the short side of the flexible touch screen 200, a vertical direction will be defined as an extending direction of the long side of the flexible touch screen 200 and a width direction will be defined as a direction perpendicular to both the horizontal direction and the vertical direction. When a top surface of the flexible touch screen 200 is bent to protrude, the flexible touch screen 200 will be defined as being convexly bent. When the top surface of the flexible touch screen 200 is bent to subside, the flexible touch screen 200 will be defined as being concavely bent.

The flexible touch screen 200 is flexible. Even when the flexible touch screen 200 is flexible, all components of the flexible touch screen 200 need not be flexible.

Referring to FIGS. 1 and 2, the flexible touch screen 200 includes a display unit 210, a touch unit 220 and a bending unit 230.

The touch unit 220 and the bending unit 230 are input units configured to receive user input, and the display unit 210 is an output unit configured to display data according to the user input.

The display unit 210 displays images. The display unit 210 may be a various types of display panels such as a liquid crystal display ("LCD") panel, an organic light emitting display ("OLED") panel, a plasma display panel, an electrophoretic display panel or an electrowetting display panel, for example. The display unit 210 may visually provide various types of information of the electronic device 100 such as a menu, input data and function setting information, for example, to a user.

The touch unit 220 senses a touch input of a user. The touch unit 200 may include various types of touch sensors such as capacitive overlay, resistive overlay, infrared beam or a pressure sensor, for example, but is not limited thereto, and any type of sensor capable of sensing a contact or an input of an object may constitute the touch unit 220 according to the invention. The touch unit 220 senses the user's touch input to generate a touch sensing signal and transmits the touch sensing signal to a control unit 300. The touch sensing signal includes coordinate data where the user inputs a touch. When the user inputs a touch position shift operation, the touch unit 220 generates a sensing signal including coordinate data of a touch position moving path and transmits the sensing signal to the control unit 300.

The bending unit 230 senses a bending input by a user. The bending unit 230 may include at least one of a proximity sensor, a pressure sensor, an acceleration sensor and a tilt sensor. The bending unit 230 senses a user bending input to generate a bending sensing signal and transmits the bending sensing signal to the control unit 300. The bending sensing signal includes data with regard to a bent region, a bent direction and a bent strength of the flexible touch screen 200.

The body part 300 includes an element for driving the flexible touch screen 200. The body part 300 includes a controller 310, a memory 320 and a power supply 330. The body part 300 may further include a mold frame (not shown) in which a storage space is formed. The controller 310, the memory 320 and the power supply 330 may be stored in the storage space.

In an exemplary embodiment of the invention, the body part 300 may have a flat shape.

The controller 310 controls an overall operation of the flexible touch screen 200.

The controller 310 according to an exemplary embodiment of the invention controls a process of transition from a lock state to an unlock state of the flexible touch screen 200. While the flexible touch screen 200 operates in the lock state, the controller 310 receives the bending sensing signal and determines whether the flexible touch screen 200 transition to the unlock state, based on the bending sensing signal. Specifically, the controller 320 makes the flexible touch screen 200 transition to the unlock state when the bending sensing signal corresponds to a predefined bending action stored in the memory 320 and makes the flexible touch screen 200 remain in the lock state when the bending sensing signal does not corresponding to a predefined bending action.

When the flexible touch screen 200 operates in the lock state, the controller 310 controls a black image or an unlock image to be displayed on the flexible touch screen 200. When the flexible touch screen 200 operates in the unlock state, the controller 310 controls a user interface object associated with a typical operation to be displayed on the flexible touch screen 200.

The memory 320 may store a program and data used for an operation of the electronic device 100 and may be divided into a program area and a data area. The program area may be provided to store a program for controlling the overall operation of the electronic device 100, an operating system ("OS") for booting the electronic device 100, an application program used to play multimedia contents and an application program used for other optional functions such as a camera function, a sound play function and an image or video play function of the electronic device 100, for example. The data area is an area which stores data generated as the electronic device 100 is used. The data area may store various types of data such as images, video data, phone books and audio data, for example.

A predefined bending action used for transition from the lock state to the unlock state of the flexible touch screen 200 may be stored as data in the memory 320 according to the exemplary embodiment of the invention. In some exemplary embodiments, the predefined bending action may include, for example, a bending action in which a user bends the left side of the flexible touch screen 200, a bending action in which a user bends the right side of the flexible touch screen 200, a bending action in which a user bends the right side and the left side of the flexible touch screen 200, a bending action in which a user bends the flexible touch screen 200 in a multiple bending manner, a bending action in which a user vertically bends the flexible touch screen 200 at least once after horizontally bending the flexible touch screen 200 at least once, a bending action in which a user vertically bends the flexible touch screen 200 at least once, a bending action in which a user horizontally bends the flexible touch screen 200 at least once after vertically bending the flexible touch screen 200 at least once, a bending action in which a user vertically bends the flexible touch screen 200 at least once after horizontally bending the flexible touch screen 200 at least once, a bending action in which a user concavely bends the flexible touch screen 200 and a bending action in which a user convexly bends the flexible touch screen 200. However, the predefined bending action is not limited to the above described exemplary embodiments of the bending actions and may include a combination of the above described exemplary embodiments of the bending actions.

The power supply 330 may supply power to the flexible touch screen 200 and the controller 310. In an exemplary embodiment, the power supply 330 may include a rechargeable battery. In an exemplary embodiment, the power supply 330 may be removably coupled to the mold frame (not shown).

Figure 3:
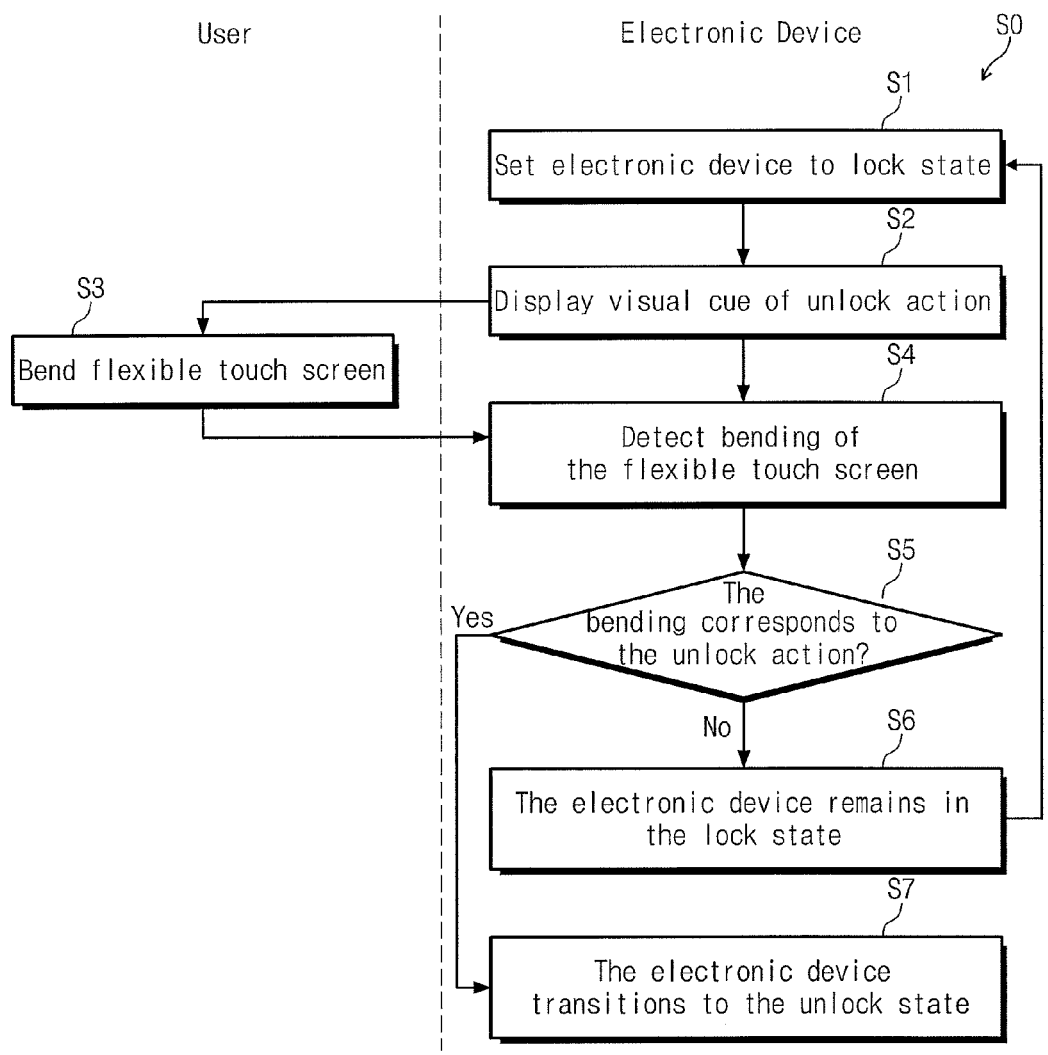
FIG. 3 is a flowchart illustrating a course of transition from a lock state to an unlock state of an electronic device according to an exemplary embodiment of the invention.

FIG. 3 is a flowchart illustrating a course of transition from a lock state to an unlock state of an electronic device 100 according to an exemplary embodiment of the invention.

While an exemplary embodiment of a flow (S0) described below includes a number of operations that appear to occur in a specific order, these processes can include more or fewer operations, which can be executed in series or in parallel using parallel processors or a multi-threading environment, for example.

Referring to FIGS. 1 and 3, the electronic device 100 is set to a lock state (S1). The electronic device 100 may be set to the lock state when satisfying at least one lock condition (i.e., full transition to the lock state from another state). The lock condition may include a predefined deactivation time elapse and an event such as entry into active call or power-on of a device, for example. The lock condition may include user intervention, i.e., user's locking of a device by a user input. In some exemplary embodiments, a user may specify an event functioning as a lock condition. A user may allow the electronic device 100 to transition to a lock state not during power-on of the electronic device 100 but during the predefined deactivation time elapse, for example.

In some exemplary embodiments, the electronic device 100 operating in the lock state displays at least one visual cue for an unlock action, in which a user may perform an unlock operation, on the flexible touch screen 200 (S2). The visual cue provides a hint of the unlock action to the user. The visual cue may be a text, graphic or a combination thereof. In some exemplary embodiments, the visual cue is displayed when a specific event occurs while the electronic device 100 operates in the lock state. A specific event allowing the display of visual cue to be started may include another event that requires an incoming call or message or user's attention. In some exemplary embodiments, the visual cue may be displayed during a specific user input such as interaction of a user with a menu button, contact of a user with the flexible touch screen 200 operating in the lock state and/or interaction of a user with another input/control device. When the electronic device 100 operating in the lock state does not display a visual cue, power consumption of the flexible touch screen 200 is reduced, thereby improves power conservation. In one exemplary embodiment, a screen saver or another object such as user's interested information such as a battery level, date and time, network strength, for example, may be displayed on the flexible touch screen 200.

An unlock action includes bending the flexible touch screen 200. In some exemplary embodiments, the unlock action is a predefined bending action. The predefined bending action is an action to change the flexible touch screen 200 from a flat state to a bent state. Exemplary embodiments of the predefined bending action may include, for example, a bending action in which a user bends the left side of the flexible touch screen 200, a bending action in which a user bends the right side of the flexible touch screen 200, a bending action in which a user bends the right side and the left side of the flexible touch screen 200, a bending action in which a user bends the flexible touch screen 200 in a multiple bending manner, a bending action in which a user vertically bends the flexible touch screen 200 at least once after horizontally bending the flexible touch screen 200 at least once, a bending action in which a user vertically bends the flexible touch screen 200 at least once, a bending action in which a user horizontally bends the flexible touch screen 200 at least once after vertically bending the flexible touch screen 200 at least once, a bending action in which a user vertically bends the flexible touch screen 200 at least once after horizontally bending the flexible touch screen 200 at least once, a bending action in which a user concavely bends the flexible touch screen 200 and a bending action in which a user convexly bends the flexible touch screen 200. However, the predefined bending action is not limited to the above described exemplary embodiments of the bending actions and may include a combination of the above described exemplary embodiments of the bending actions.

While the flexible touch screen 200 operates in the lock state, a user may start to bend the flexible touch screen 200 (S3). In an exemplary embodiment, a user may bend the flexible touch screen 200 using at least one finger of at least one hand, for example, but is not limited thereto, and the flexible touch screen 200 may be bent using any part of a body such as two fingers, two hands, for example. In one exemplary embodiment, the flexible touch screen 200 may be bent using any suitable objects or belongings.

The electronic device 100 detects the bending of the flexible touch screen 200 (S4). When the bending does not correspond to a trial to perform the unlock action or a user stops the bending action (S5, No), the electronic device 100 remains in the unlock state (S6). In an exemplary embodiment, when the unlock action is predefined to an action to bend the flexible touch screen 200 in a width direction and the detected bending is an action to bend the flexible touch screen 200 in a length direction, for example, the electronic device 100 remains in the unlock state because the bending does not correspond to the unlock action.

When the bending corresponds to a successful unlock action and the user successfully performs the unlock action (S5, Yes), the electronic device 100 transitions from the lock state to the unlock state (S7). In an exemplary embodiment, when the unlock action is an action to bend the flexible touch screen 200 in the width direction and the detected bending is an action to bend the flexible touch screen 200 in the width direction, for example, the electronic device 100 transitions from the lock state to the unlock state.

In some exemplary embodiments, the electronic device 100 starts a process of transition from the lock state to the unlock state when the bending of the flexible touch screen 200 is detected and immediately stops the transition when the bending does not correspond to the unlock action or is determined to be a failed or stopped unlock action. In an exemplary embodiment, when the unlock action is predefined to bend the flexible touch screen 200 twice in the width direction, for example, the electronic device 100 starts a process of transition to the unlock state shortly after detecting a first bending, and continues to perform the transition while the first bending is performed. When the user stop the first bending before performing a second bending of the flexible touch screen 200, the electronic device 100 stops the transition and remains in the lock state. When the user bends the flexible touch screen 200 twice in the width direction according to the predefined unlock action, the electronic device 100 terminates the transition to the unlock state. In other exemplary embodiments, the unlock action is predefined to horizontally bend the flexible touch screen 200 twice and the user bends the flexible touch screen 200 once in the length direction after bending the flexible touch screen 200 once in the width direction. In this case, the electronic device 100 transitions to the unlock state shortly after detecting the first bending of the flexible touch screen 200 but immediately stops the transition to the unlock state because the second bending of the flexible touch screen 200 does not correspond to the unlock action.

When the electronic device 100 is unlocked, the flexible touch screen 200 may display a user interface object corresponding to one or more functions and/or user's interested information. The user interface object constitutes a user interface of the electronic device 100 and may include a text, an image, an icon, a soft key (or virtual button), a pull-down menu, a radio button, a check box and a selection function list, for example, but is not limited thereto. In an exemplary embodiment, the displayed user interface object may include a non-interactive object, an interactive object or a combination thereof. The non-interactive object transmits information related to looks and feels of a user interface and the interactive object interacts with a user.

While the electronic device 100 operates in the lock state, the user may contact the flexible touch screen 200. However, the electronic device 200 in the lock state is inhibited from performing a predefined operation set in response to a detected contact until the electronic device 200 is unlocked. The inhibited predefined operation set may include navigation between a user interface and a user data input.

While operating in the lock state, the electronic device 100 may display at least one visual cue for the unlock action. In some exemplary embodiments, the electronic device 100 may display an unlock image together with the visual cue. The unlock image is an interacting graphic and interactive user interface object for unlocking the electronic device 100. That is, the unlock action is performed according to the visual cue of the unlock image.

In some exemplary embodiments, the electronic device 100 provides non-visual feedback other than visual feedback to indicate termination of the unlock operation. The non-visual feedback may include audible feedback (e.g., sound) or physical feedback (e.g., vibration).

Figure 4A:
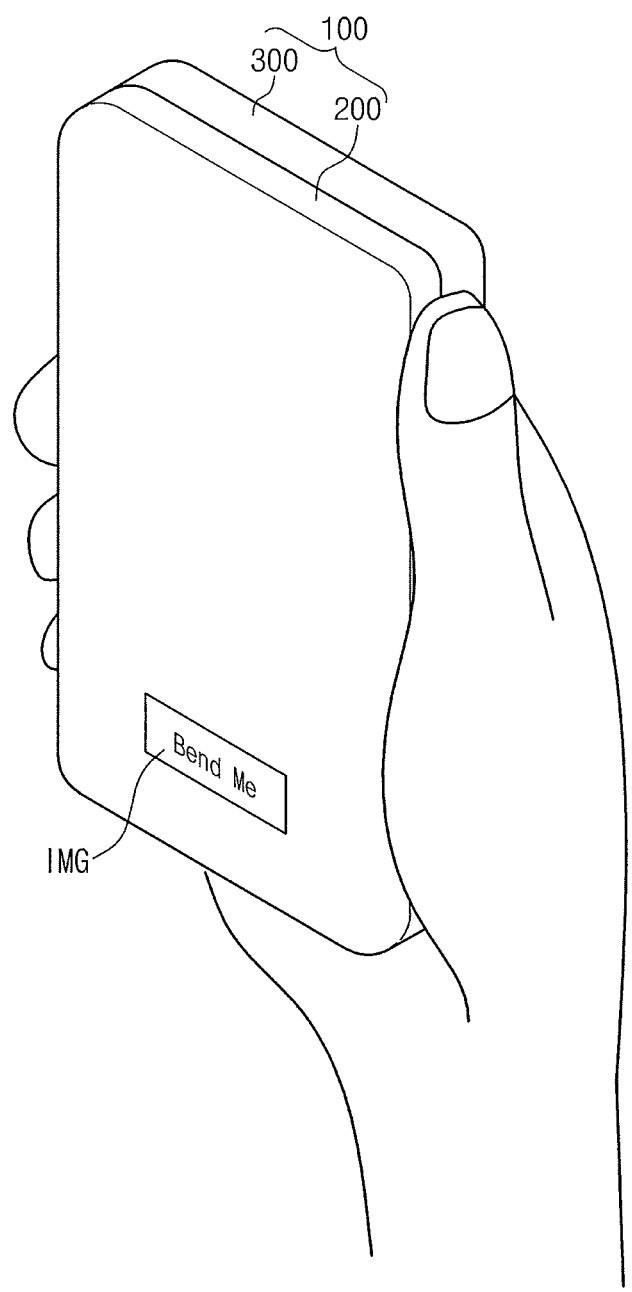
FIGS. 4A to 4C are perspective views illustrating a process of performing an unlocking action on an electronic device according to an exemplary embodiment of the invention.
Figure 4B:
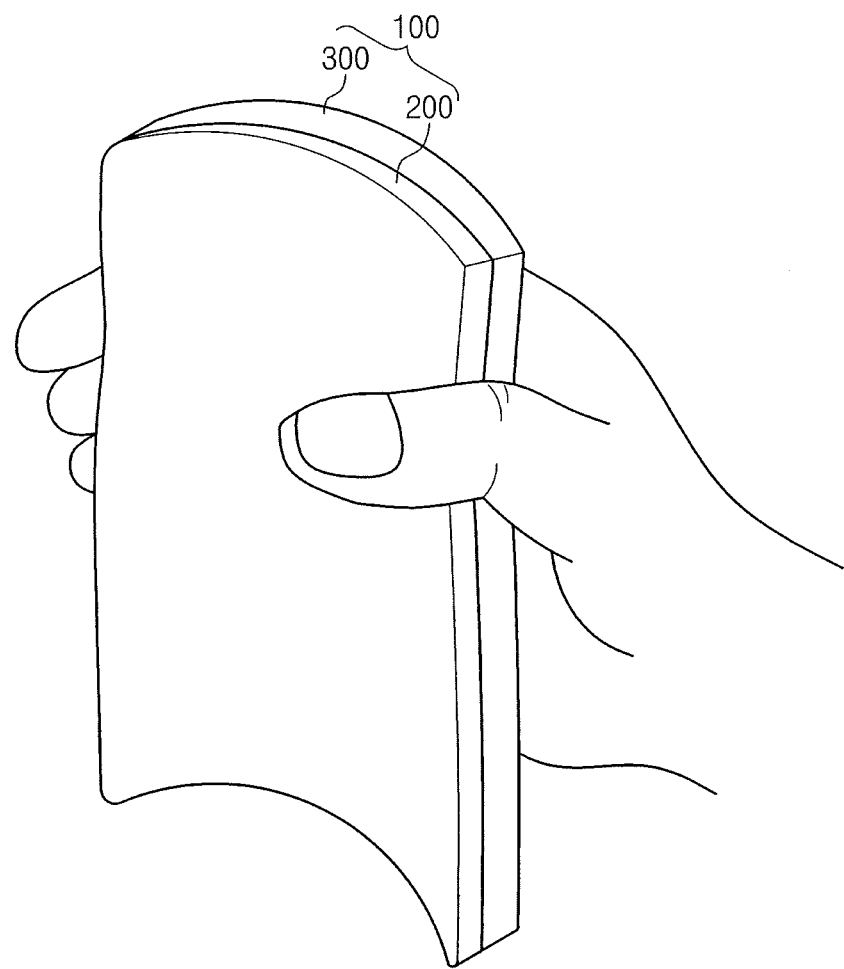
Figure 4C:
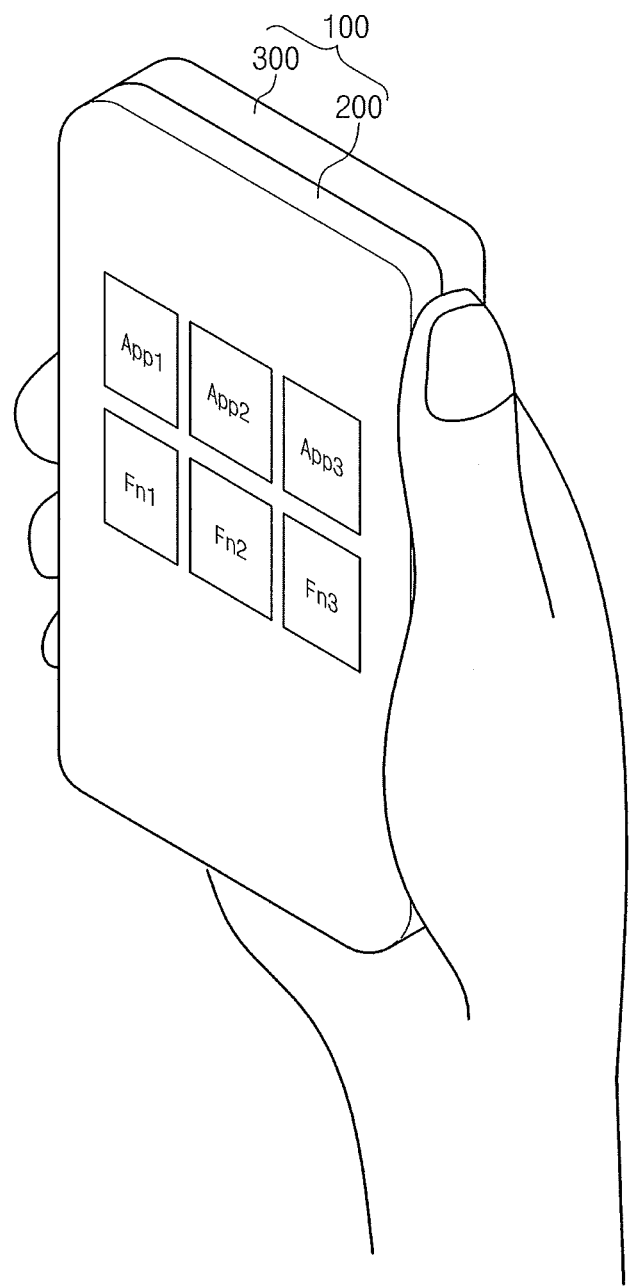

FIGS. 4A to 4C illustrate a process of performing an unlocking action on an electronic device 100 according to an exemplary embodiment of the invention.

Referring to FIG. 4A, the flexible touch screen 200 operates first in a lock mode and a sleep mode and displays an unlock image IMG when being touched by a user. In an exemplary embodiment, the unlock image IMG may imply a direct meaning of bending. In an exemplary embodiment, the unlock image IMG may include a wording such as "Bend me," for example. A user presses both sides of the electronic device 100 to start an unlock action. It is determined whether a trial is made to unlock the flexible touch screen 200, based on the fact that the flexible touch screen 200 is bent, the electronic device 100 detects the bending and the user interacts with an unlock image IMG.

Referring to FIG. 4B, the user continuously presses both the sides of the electronic device 100 in the width direction to perform an unlock action. The unlock action may be predefined bending to bend the electronic device 100 one or more times. In an exemplary embodiment, the predefined bending may be performed two or more times to effectively prevent the electronic device 100 from being unintentionally unlocked while the user handles the electronic device 100. In the above described exemplary embodiment, the user must bend the electronic device 100 two or more times for a predetermined time. When the predefined bending action is performed, the electronic device 100 is unlocked and the flexible touch screen displays a user interface object associated with a general operation in the unlock state.

FIG. 4C shows an exemplary embodiment of a user interface object displayed on the flexible touch screen 200 when the electronic device 100 operates in an unlock state. A user may interact with the user interface object to activate an application App1 to App3 or a specific function Fn1 to Fn3, for example, but is not limited thereto.

In some exemplary embodiments, the unlock image IMG may be used to indicate failure in performing an unlock action. When the user does not perform predefined bending, for example, the unlock action fails. According to user's option, the electronic device 100 may display an unlock image IMG implying bending the electronic device 100 while allowing the user to try to perform the unlock action one more time. The electronic device 100 returns to a sleep mode when the bending is not detected for a predetermined time.

Figure 5A:
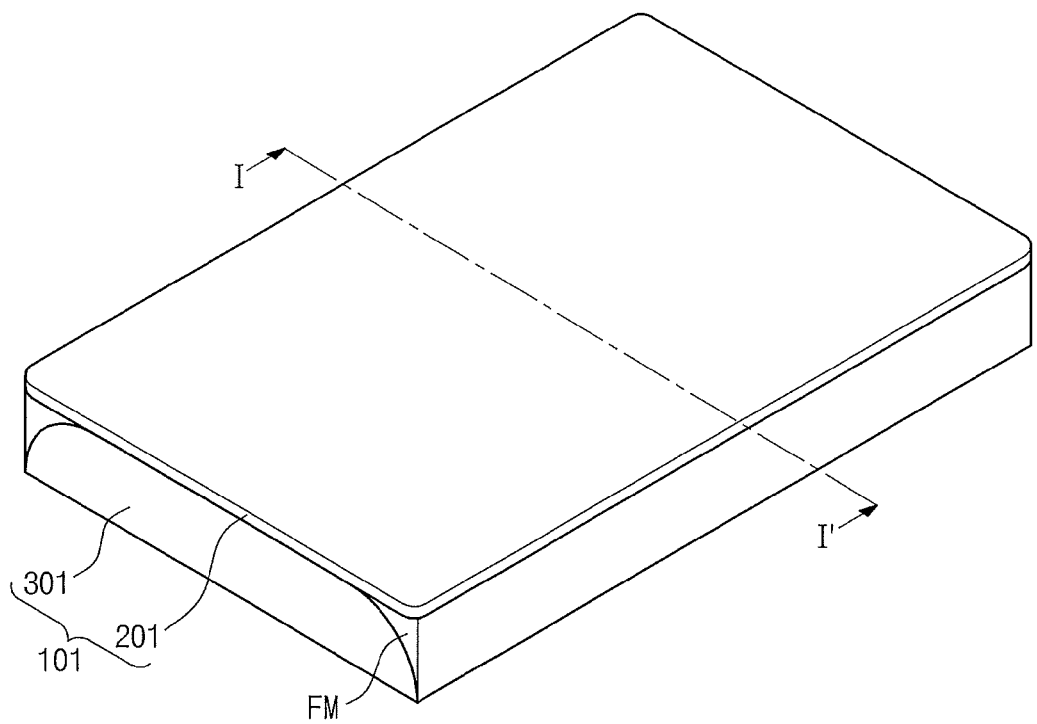
FIG. 5A is a perspective view of an electronic device according to another exemplary embodiment of the invention.
Figure 5B:
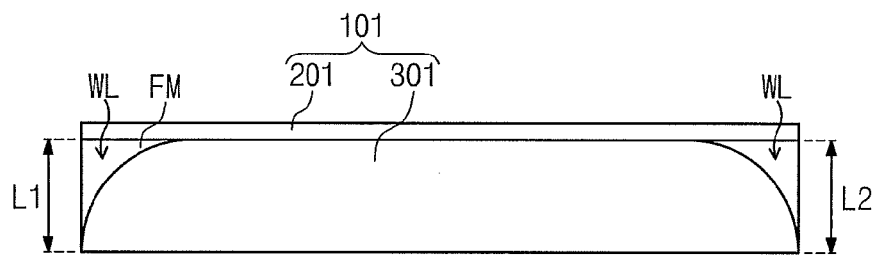
FIG. 5B is a cross-sectional view taken along a line I-I' in FIG. 5A.

FIG. 5A is a perspective view of an electronic device 101 according to another exemplary embodiment of the invention, and FIG. 5B is a cross-sectional view taken along a line I-I' in FIG. 5A.

Referring to FIGS. 5A and 5B, the electronic device 101 includes a flexible touch screen 201 and a body part 301. The flexible touch screen 201 and the body part 301 are different in structure compared with the flexible touch screen 200 and the flexible body part 300 described with reference to FIGS. 1 and 2. Hereinafter, the differences in structure will be specifically explained. Unexplained features of the flexible touch screen 201 and the body part 301 are similar to the exemplary embodiment of the flexible touch screen 200 and the flexible body part 300 described in FIGS. 1 and 2.

The flexible touch screen 201 is provided in a flat form. The flexible touch screen 201 may be bent by an external force due to its flexibility.

The body part 301 has no flexibility. A mold frame (not shown) determining the appearance of the body part 301 may be made of a hard material, for example.

The body part 301 is provided below the flexible touch screen 201. At least one side of a top surface of the body part 301 may be spaced apart from the flexible touch screen 201 in a thickness direction. In FIGS. 5A and 5B, both sides of the top surface of the body part 301 are spaced apart from the flexible touch screen 201 in the thickness direction.

For achieving this, both side edge regions of the top surface of the body part 301 is provided in a curved shape. A spaced groove WL is formed between the both sides, e.g., edge regions, of the top surface of the body part 301 and the flexible touch screen 201.

The electronic device 101 may further include a flexible material FM disposed at the spaced groove WL. The flexible material FM may be a porous flexible material.

A left edge of the body part 301 and the flexible touch screen 201 are spaced apart from each other in the thickness direction by a left spaced distance L1. In addition, a right edge of the body part 301 and the flexible touch screen 201 are spaced apart from each other in the thickness direction by a right spaced distance L2. The left spaced distance L1 and the right spaced distance L2 are spaces for bending the flexible touch screen 201 when a user presses both sides of the flexible touch screen 201. That is, the left and right spaced distances L1 and L2 are not changed when the user does not press the flexible touch screen 201 and may be zero when the user presses both sides of the flexible touch screen 201 with a maximum force to make the top surface of the flexible touch screen 201 convex. In an exemplary embodiment, the left and right spaced distances L1 and L2 may be maximal when the user presses both sides of the flexible touch screen 201 with the maximum force to make the top surface of the flexible touch screen 201 concave.

The electronic device 101 senses change of the left and right spaced distances L1 and L2 to detect whether the flexible touch screen 201 is bent. When the change of the left and right spaced distances L1 and L2 is greater than a predefined value, the electronic device 101 may determine that the flexible touch screen 201 is bent.

When the left and the right spaced distances L1 and L2 are sensed to be greater than those before the bending, the electronic device 101 may determine that the flexible touch screen 201 is concavely bent. When the left and the right spaced distances L1 and L2 are sensed to be smaller than those before the bending, the electronic device 101 may determine that the flexible touch screen 201 is convexly bent.

In an exemplary embodiment, the electronic device 101 may independently sense at least one of the change of the left spaced distance L1 and the change of the right spaced distance L2.

Figure 6A:
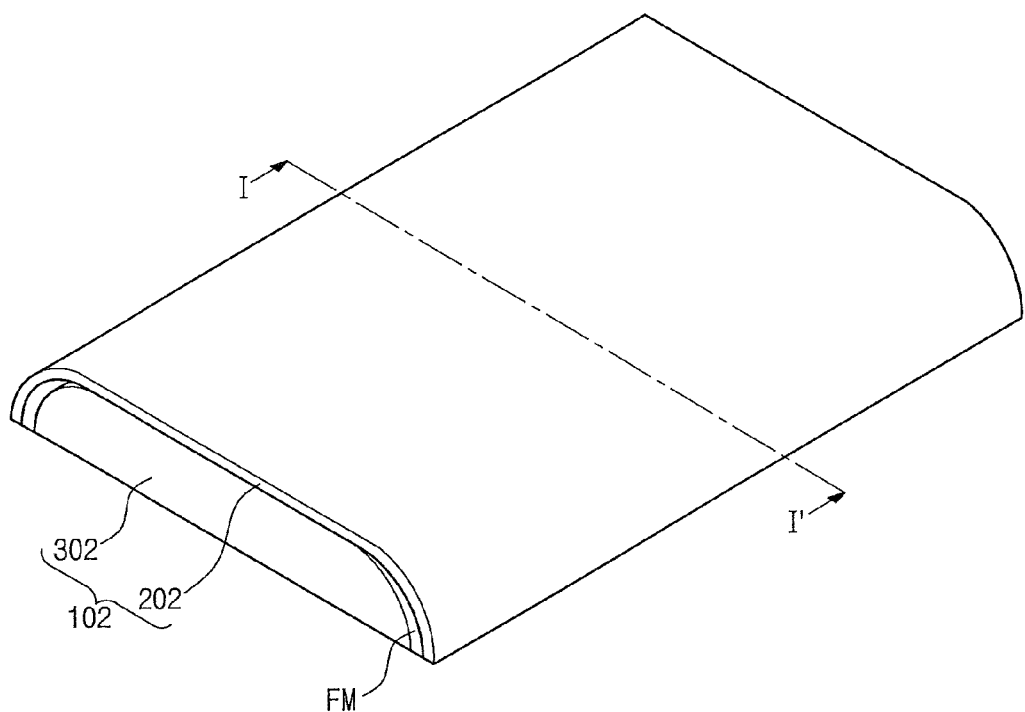
FIG. 6A is a perspective view of an electronic device according to another exemplary embodiment of the invention.
Figure 6B:
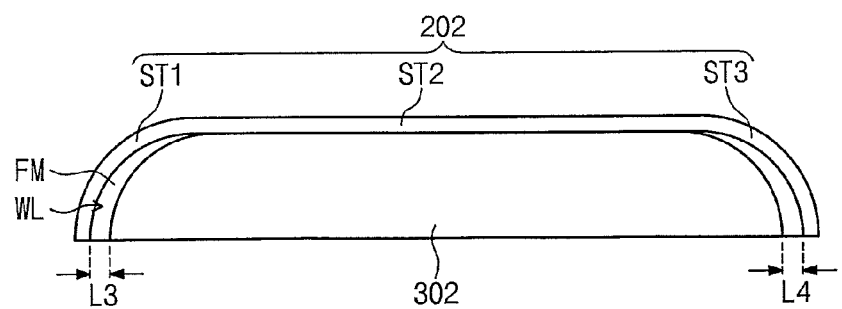
FIG. 6B is a cross-sectional view taken along a line I-I' in FIG. 6A.

FIG. 6A is a perspective view of an electronic device 102 according to another exemplary embodiment of the invention, and FIG. 6B is a cross-sectional view taken along a line I-I' in FIG. 6A.

Referring to FIGS. 6A and 6B, the electronic device 102 includes a flexible touch screen 202 and a body part 302. The body part 302 is substantially identical to the body part 301 in the exemplary embodiment explained with reference to FIGS. 5A and 5B and will not be explained in further detail.

The flexible touch screen 202 is disposed on the body part 302. The flexible touch screen 202 may include a left area ST1, a middle area ST2 and a right area ST3. Although the flexible touch screen 202 are divided into the left area ST1, the middle area ST2 and the right area ST3 for the convenience of explanation, the area ST1, the middle area ST2 and the right area ST3 may be integrally formed.

The middle area ST2 is disposed between the left area ST1 and the right area ST2 and not spaced apart from the body part 302.

The left area ST1 is provided in a curved shape along a left edge area of a top surface of the body part 302. The left area ST1 may be spaced apart from a left edge of the body part 302 in a width direction by a left spaced distance L3.

The right area ST3 is provided in a curved shape along a right edge area of the top surface of the body part 302. The right area ST3 is spaced apart from a right edge of the body part 302 in the width direction by a right spaced distance L4.

A spaced groove WL is formed between the left edge area of the top surface of the body part 302 and the left area ST1 and between the right edge area of the top surface of the body part 302 and the right area ST3.

The electronic device 102 may further include a flexible material FM disposed at the spaced groove WL. In an exemplary embodiment, the flexible material FM may be a porous flexible material.

The electronic device 102 senses changes of the left and right spaced distances L3 and L4 to detect whether the flexible touch screen 202 is bent. When the change of the left and right spaced distances L3 and L4 is greater than a predefined value, the electronic device 102 may determine that the flexible touch screen 202 is bent.

When the left and the right spaced distances L3 and L4 are sensed to be greater than those before the bending, the electronic device 102 may determine that the flexible touch screen 202 is concavely bent. When the left and the right spaced distances L3 and L4 are sensed to be smaller than those before the bending, the electronic device 102 may determine that the flexible touch screen 202 is convexly bent.

The electronic device 102 may independently sense at least one of the change of the left spaced distance L3 and the change of the right spaced distance L4.

Hereinafter, a zooming control method based on a bending action in an electronic device according to exemplary embodiments of the invention will now be described.

FIG. 7 is a flowchart illustrating a zooming control method based on a bending action in an electronic device according to exemplary embodiments of the invention.

Referring to FIG. 7, the electronic device executes a selected mode (S101). The selected mode indicates an application that requires an object image to be displayed. In an exemplary embodiment, the selected mode may be a web page display mode in a web browser function or environment, a photo data display mode in a camera function or environment or a text display mode in a text viewer function or environment, for example. A target image is displayed on a flexible touch screen in a visual form.

The electronic device senses occurrence of interrupt (S103). The interrupt indicates a signal or instruction input through a touch screen or a special function key by a user to stop an application under execution. The interrupt may be a predefined bending action. In some exemplary embodiments, the predefined bending action may include, for example, a bending action in which a user bends the left side of the flexible touch screen, a bending action in which a user bends the right side of the flexible touch screen, a bending action in which a user bends the right side and the left side of the flexible touch screen, a bending action in which a user bends the flexible touch screen in a multiple bending manner, a bending action in which a user vertically bends the flexible touch screen at least once after horizontally bending the flexible touch screen at least once, a bending action in which a user vertically bends the flexible touch screen at least once, a bending action in which a user horizontally bends the flexible touch screen at least once after vertically bending the flexible touch screen at least once, a bending action in which a user vertically bends the flexible touch screen at least once after horizontally bending the flexible touch screen at least once, a bending action in which a user concavely bends the flexible touch screen and a bending action in which a user convexly bends the flexible touch screen. However, the predefined bending action is not limited to the above described exemplary embodiments of the bending actions and may include a combination of the above described exemplary embodiments of the bending actions.

The electronic device determines whether the interrupt is to request a zoom mode (S105). The request for the zoom mode may be set as one of the predefined bending actions. Hereinafter, the request for the zoom mode will be explained based on a fact that a flexible touch screen is bent once for a predetermined time or longer.

When the interrupt is to request the zoom mode, the electronic device performs zooming control of the target image according to a user input (S107). This will be explained in detail later.

When the interrupt is not to request the zoom mode, the electronic device determines whether the interrupt request a toggle mode (S109). The request for the toggle mode may be set not as the request for the zoom mode but as one of the predefined bending actions. Hereinafter, the request for the toggle mode will be explained based on a fact that the flexible touch screen is bent successively twice.

When the interrupt is to request the toggle mode, the electronic device performs toggling control of the target image (S111). This will be explained in detail later.

When the interrupt is not to request the toggle mode, the electronic device performs another operation corresponding to the interrupt (S113). When the interrupt is to request a specific menu, for example, the electronic device displays the requested menu. In addition, when the interrupt is to select a specific icon, the electronic device performs a function assigned to the selected icon or executes an application assigned to the selected icon.

Hereinafter, a zooming control process of a target image in a zoom mode will be described.

Figure 8:
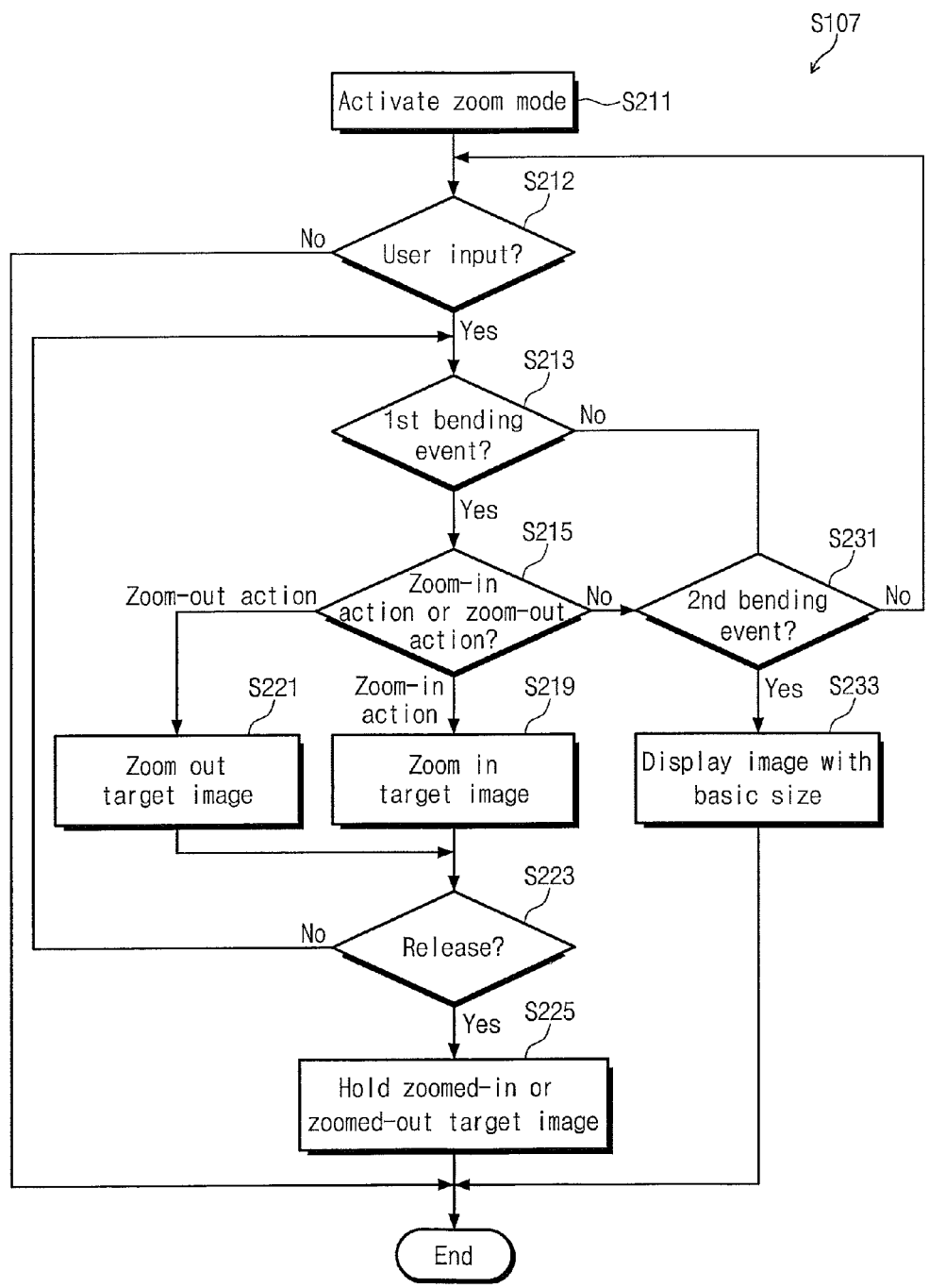
FIG. 8 is a flowchart illustrating zooming control operations in FIG. 7.

FIG. 8 is a flowchart illustrating zooming control operations in FIG. 7.

Referring to FIGS. 7 and 8, when the interrupt is to request a zoom mode, the electronic device activates the zoom mode (S211). At this point, the electronic device displays an overlay layer overlapping a target image on a flexible touch screen. The overlay layer is displayed to suitably receive a user input that will be explained later. The electronic device may also display a graphical element on the flexible touch screen such that a user intuitively recognizes activation of the zoom mode.

The electronic device determines whether a user input based on bending is detected (S212). At this point, the electronic device may measure time until the user input is detected after activation of the zoom mode. When the user input is not detected for the predefined time, the electronic device stops the zoom mode.

When the user input is detected, the electronic device determines whether the user input is a first bending event (S213). When the user input is not the first bending event, the electronic device determines whether the user input is a second bending event (S231). When the user input is neither the first bending event nor the second bending event, the flow proceeds to operation S212.

The first bending event and the second bending event may be one of the defined bending actions. In an exemplary embodiment, the first bending event may be to bend the flexible touch screen once, and the second bending event may be to bend the flexible touch screen twice, for example.

When the user input is the first bending event, the electronic device determines whether the first bending event is a zoom-in action or a zoom-out action (S215). The zoom-in action and the zoom-out action may be different from each other while being compatible with the first bending event. In an exemplary embodiment, the zoom-in action may be to bend both sides of the flexible touch screen once for a predetermined time or longer, and the zoom-out action may be to bend both sides of the flexible touch screen for a time shorter than the predetermined time, for example. However, the zoom-in and zoom-out actions are not limited thereto, and the zoom-in action may be to convexly bend the flexible touch screen and the zoom-out action may be to concavely bend the flexible touch screen. Moreover, the zoom-in action may be to horizontally bend the flexible touch screen once and the zoom-out action may be to vertically bend the flexible touch screen once. That is, any two bending actions may be set as the zoom-in action and the zoom-out action, respectively.

When the first bending event is the zoom-in action, the electronic device zooms in the target image during the zoom-in action (S219). At this point, an image displayed on a middle of the flexible touch screen may be a center point of the zoom-in action. A zoom-in ratio of the target image may be in proportion to a time when the flexible touch screen is released from the zoom-in action.

When the first bending event is the zoom-out action, the electronic device zooms out the target image during the zoom-out action (S221). At this point, an image displayed on a middle of the flexible touch screen may be a center point of the zoom-out action. A zoom-out ratio of the target image may be in proportion to a time when the flexible touch screen is released from the zoom-out action.

While any one of the zoom-in and zoom-out actions is executed, the electronic device determines whether the flexible touch screen is released from the first bending event (S223).

When the flexible touch screen is not released from the first bending event, the electronic device returns to operation S213.

When the flexible touch screen is released from the first bending event, the electronic device holds the zoomed-in or zoomed-out target image until the flexible touch screen is released from the first bending event (S225).

When the user input is the second bending event, the electronic device provides the target image with a predefined default size (S233). That is, the electronic device converts the zoomed-in or zoom-out target image into a default-sized image prior to zoom-in or zoom-out. In an exemplary embodiment of the invention, the second bending event may be set to successively bend the flexible touch screen twice within a predetermined time.

Hereinafter, a toggling control process of a target image in a toggle mode will be described.

Figure 9:
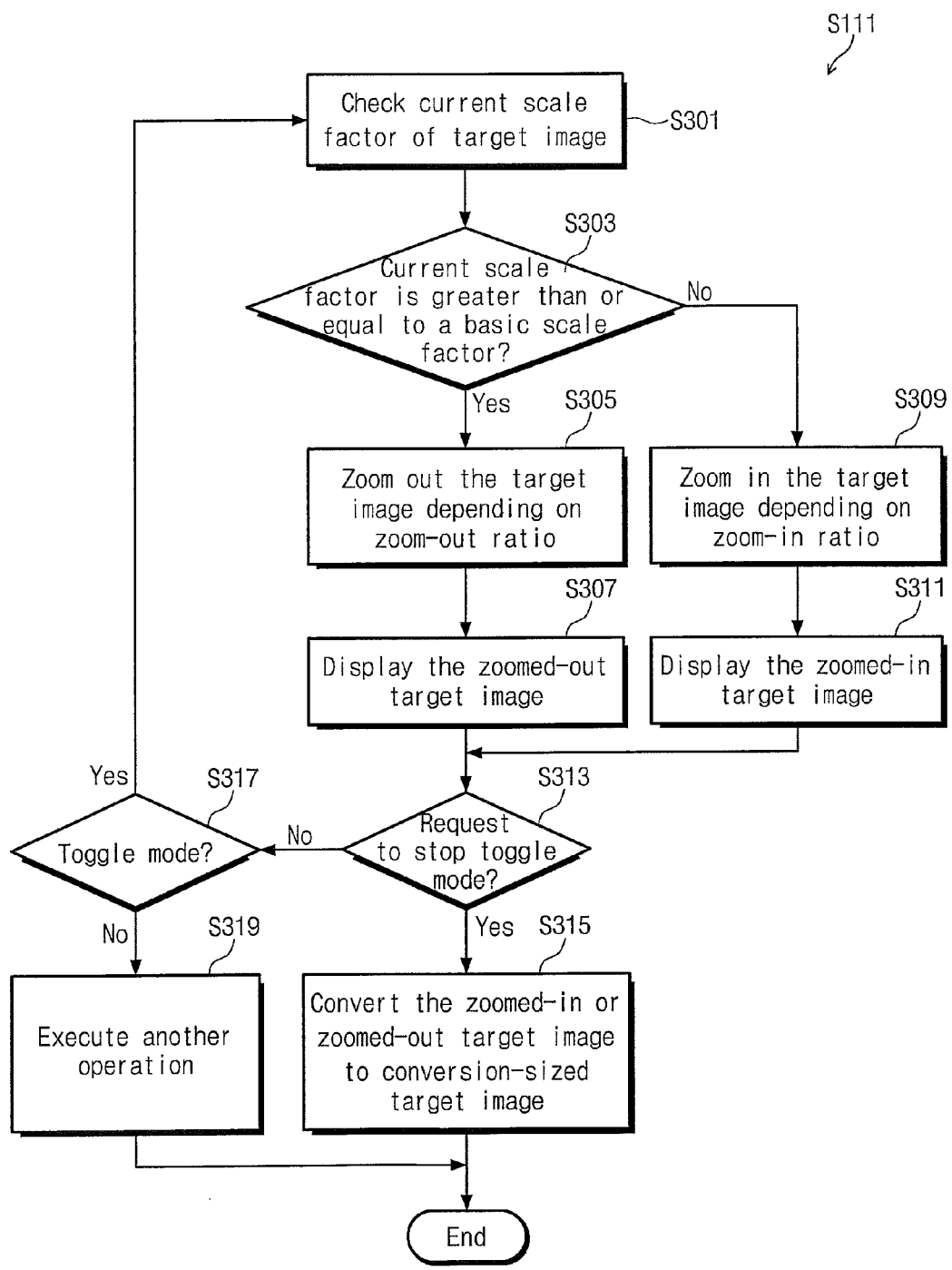
FIG. 9 is a flowchart illustrating toggling control operations in FIG. 7.

FIG. 9 is a flowchart illustrating toggling control operations in FIG. 7.

Referring to FIG. 9, when the interrupt is to request a toggle mode, the electronic device checks a current scale factor of a target image displayed on the flexible touch screen (S301). That is, the electronic device finds out a ratio of a current size of the target image to a default size of the target image.

The electronic device determines whether the current scale factor is greater than or equal to a predefined default scale factor (S303). The predefined default scale factor is a specific scale factor that is commonly used when the electronic device displays the target image.

When the current scale factor of the target image is greater than or equal to the default scale factor, the electronic device zooms out the target image depending on a zoom-out ratio (S305). The electronic device displays the zoomed-out target image on the flexible touch screen (S307). That is, when receiving an interrupt to request a toggle mode while the target image is displayed at a specific scale factor that is equal to or greater than the default scale factor, the electronic device scales down the target image. The scaling down of the target image complies with the zoom-out ratio. When the zoom-out ratio is fixed to a minimum scale factor, the electronic device may obtain an effect to provide a preview image through toggling control. When a part of a text page is displayed at a default scale factor through a text view function, for example, the electronic device may zoom out the text page at a minimum scale factor according to a toggle mode request to display the entire text page.

The electronic device determines whether there is a request to stop a toggle mode while displaying the zoomed-out target image (S313). When there is the request to stop the toggle mode, the electronic device displays the zoomed-out target image after converting the zoomed-out target image into a conversion-sized target image (S315). At this point, the conversion size may be any one of a size before the target image is zoomed in or out, a size of a target image to which the default scale factor is applied and a size of the zoomed-in or zoomed-out target image.

That is, the electronic device displays the target image after converting the target image at the current scale factor detected in operation S301. However, the conversion is not limited thereto, and the electronic device may display the zoomed-out target image after converting the zoomed-out target image at the default scale factor or may display the zoomed-out target image without conversion.

When there is no request to stop the toggle mode, the electronic device determines whether there is a request for the toggle mode (S317). The operation S317 is substantially identical to the operation S109 in FIG. 7 and will not be explained in further detail.

When there is a request for the toggle mode, the electronic device proceeds to the operation S301. After returning to the operation S301, the electronic device proceeds to operation S309 through the operation S303. That is, since the target image is zoomed out through the operations S305 and 307, the current scale factor of the target image may be smaller than the default scale factor at the operation S303. In this case, the electronic device proceeds to operations S309 and S311 to perform an operation of zooming in the target image.

When the target image is zoomed out according to a request for a first toggle mode, the electronic device may restore the zoomed-out target image at a default scale factor or zoom in the zoomed-out target image at a scale factor greater than the default scale factor.

When the current scale factor of the target image is smaller than the default scale factor, the electronic device zooms in the target image according to a zoom-in ratio (S309). Next, the electronic device displays the zoomed-in target image on the flexible touch screen (S311). That is, when receiving an interrupt to request the toggle mode while the target image is displayed at a specific scale factor smaller than the default scale factor, the electronic device scales up the target image. The scaling up of the target image complies with the zoom-in ratio. When the zoom-in ratio is fixed to a maximum scale factor, the electronic device may have an effect to use a magnifying glass through toggling control. When a page of document is displayed at a relatively low scale factor through a document viewer function, for example, the electronic device zooms in the page of document at a maximum scale factor according to a toggle mode request to display a part of the page of document.

The electronic device determines whether there is a request to stop the toggle mode (S313). At this point, the conversion size may be any one of a size before the target image is zoomed in or out, a size of a target image to which the default scale factor is applied and a size of the zoomed-in or zoomed-out target image.

When there is no request to stop the toggle mode, the electronic device determines whether there is a request for the toggle mode (S317).

When there is the request for the toggle mode, the electronic device proceeds to operation S305 through the operation S303. After returning to the operation S301, the electronic device proceeds to the operation S305 through the operation S303. That is, since the target image is zoomed in through the operations S309 and S311, the current scale factor of the target image may be greater than or equal to the default scale factor. In this case, the electronic device may proceed to the operations S305 and S307 to perform an operation of zooming out the target image.

When zooming in the target image according to the request for first toggle mode, the electronic device may restore the zoomed-in target image at a default scale factor or zooms out the target image at a scale factor smaller than the default scale factor according to a request for second toggle mode.

When there is no request for toggle mode, the electronic device may perform another operation (S319). The another operation may be different from the zooming control and the toggling control. The another operation may be, for example, that the electron device displays a requested menu, executes a function assigned to a specific icon or executes an application assigned to the specific icon.

Figure 10A:
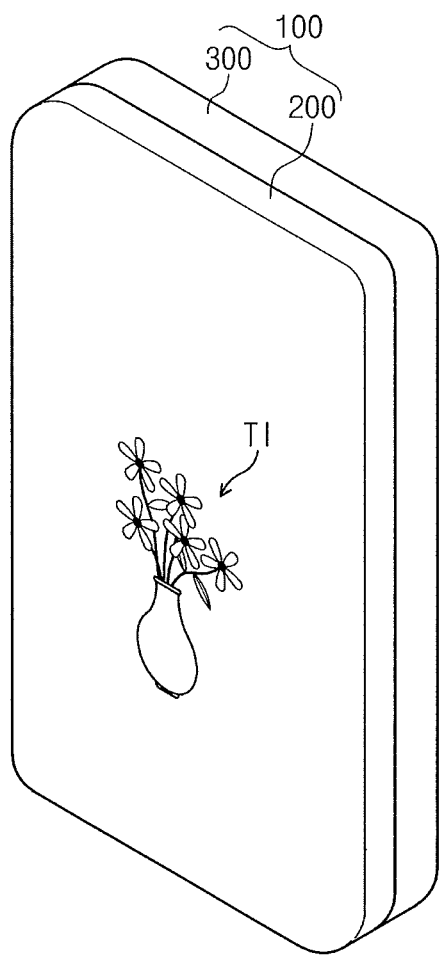
FIGS. 10A to 10C are perspective views illustrating a zooming control process in an electronic device according to an exemplary embodiment of the invention.
Figure 10B:
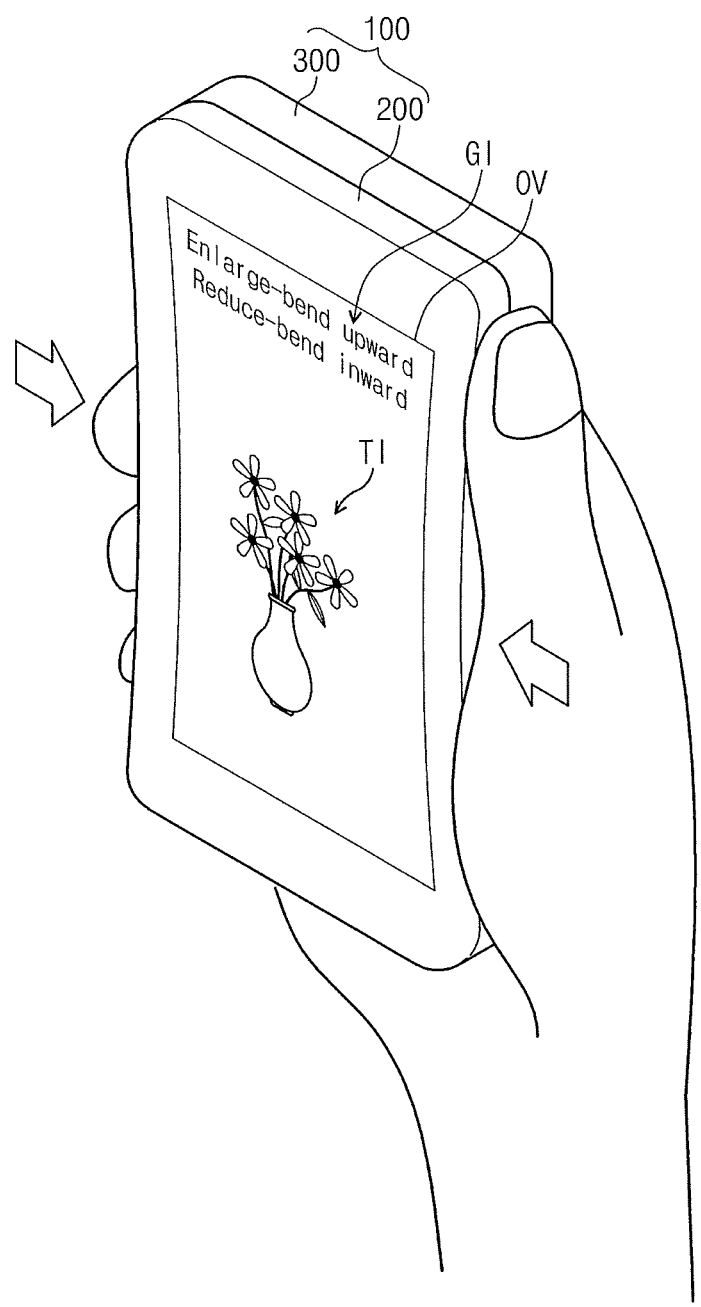
Figure 10C:

FIGS. 10A to 10C illustrate a zooming control process in an electronic device 100 according to an exemplary embodiment of the invention.

Referring to FIG. 10A, the electronic device 100 displays a target image TI of specific contents in a selected mode. In FIG. 10A, specific image data displayed under an image viewer environment is shown as an exemplary embodiment of the target image TI.

Referring to FIG. 10B, a user bends a flexible touch screen 200 once by pressing both sides of the electronic device 100 to activate a zoom mode. At this point, the electronic device 100 may display an overlay layer OV overlapping the target image. The electronic device 100 may display a selectable zooming operation and a graphical element GI for instructing the zooming operation. The overlay layer OV and the graphical element GI may be optional according to user's setting.

Referring to FIGS. 10B and 10C, the electronic device 100 receives a zoom-in or zoom-out action from a user to zoom in or out the target image TI. FIG. 10C shows an exemplary embodiment where the user convexly bend the flexible touch screen 200 to display a zoomed-in target image TI0 on the flexible touch screen 200 when the zoom-in action is set to convexly bend the flexible touch screen 200.

Figure 11A:
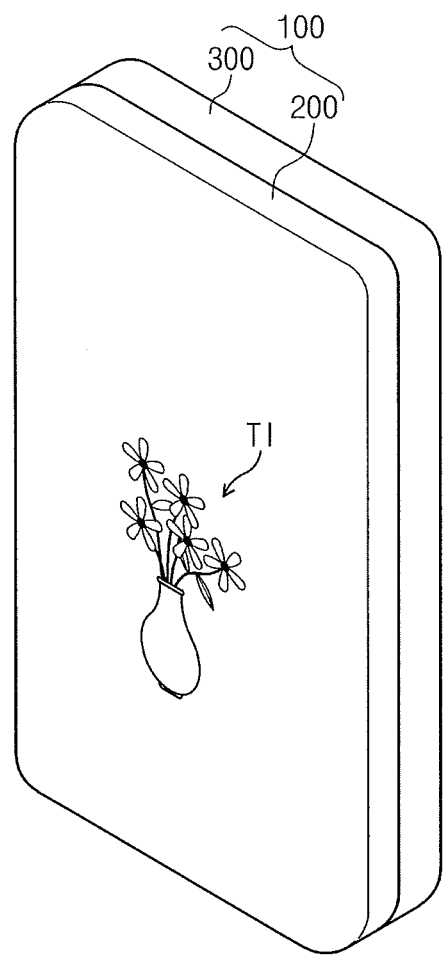
FIGS. 11A to 11C are perspective views illustrating a toggling control process in an electronic device according to an exemplary embodiment of the invention.
Figure 11B:
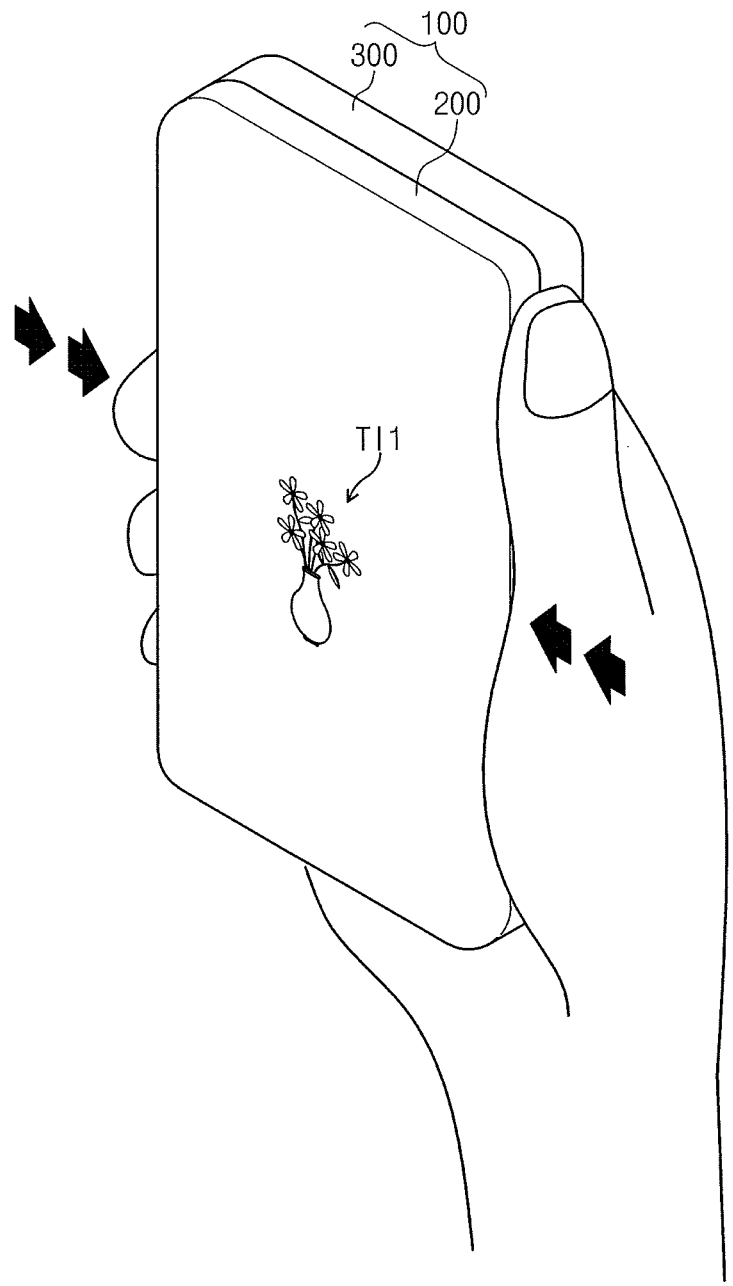
Figure 11C:
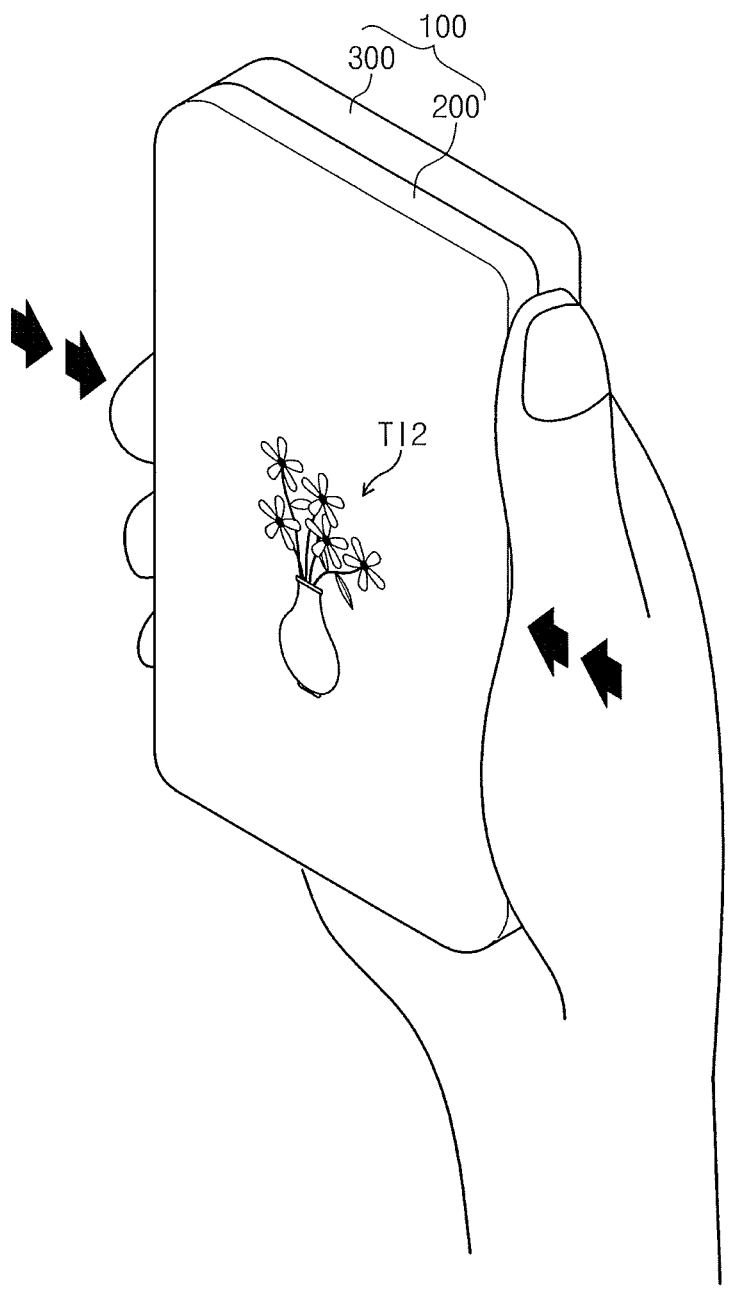

FIGS. 11A to 11C illustrate a toggling control process in an electronic device 100 according to an exemplary embodiment of the invention.

Referring to FIG. 11A, the electronic device 100 displays a target image TI of specific contents in a selected mode. In FIG. 11A, specific image data displayed under an image viewer environment is shown as an exemplary embodiment of the target image TI.

Referring to FIG. 11B, a user bends a flexible touch screen 200 twice by successively both sides of the electronic device 100 to perform first toggling control on the target image TI. At this point, the electronic device 100 zooms out the target image TI according to a zoom-out ratio when a current scale factor of the target image TI is greater than or equal to a default scale factor. FIG. 11B shows an exemplary embodiment where the flexible touch screen 200 displays a zoomed-out target image TI1.

Referring to FIG. 11C, the user bends the flexible touch screen 200 twice by successively pressing both sides of the electronic device 100 to perform second toggling control on the zoomed-out target image TI1. Since the target image TI1 is zoomed out by the first toggling control in FIG. 11B, a current scale factor of the zoomed-out target image TI1 may be smaller than a default scale factor. The electronic device 100 zooms in the zoomed-out target image TI1 at a zoom-in ratio. The electronic device 100 may display the zoomed-out target image TI1 at any one of the default scale factor or a scale factor greater than the default scale factor. FIG. 11C shows an exemplary embodiment where the flexible touch screen 200 displays a zoomed-in target image TI2.

As described so far, an electronic device can be unlocked by bending using flexibility of a flexible touch screen. In addition, an electronic device can be unlocked not only when the electronic device is flexible but also when some components of the electronic device are not flexible. Moreover, zooming control and toggling control of a target image can be performed based on a bending action.

While the invention have been particularly shown and described with reference to exemplary embodiments thereof, it will be apparent to those of ordinary skill in the art that various changes in form and detail may be made therein without departing from the spirit and scope of the invention.

What is claimed is:

1. An electronic device comprising:
   a flexible touch screen including:
      a display unit configured to display an image; and
      a bending unit configured to sense a user bending input; and
   a body part disposed below the flexible touch screen and including:
      a controller configured to control a transition from a lock state to an unlock state of the flexible touch screen based on the user bending input; and
      a memory configured to store a predefined bending action used to transition from the lock state to the unlock state of the flexible touch screen,
   wherein
   a spaced groove is defined between at least one side of a top surface of the body part and a bottom surface of the flexible touch screen in a thickness direction, and
   a portion of the top surface of the body part facing the flexible touch screen contacts the bottom surface of the flexible touch screen facing the body part.

2. The electronic device as set forth in claim 1, wherein the flexible touch screen and the body part are flexible.

3. The electronic device as set forth in claim 2, wherein the body part and the flexible touch screen are substantially flat.

4. The electronic device as set forth in claim 1, wherein the predefined bending action includes at least one of bending one side of the flexible touch screen and bending opposite sides of the flexible touch screen.

5. The electronic device as set forth in claim 1, wherein the predefined bending action includes at least one of bending the flexible touch screen once and bending the flexible touch screen two or more times.

6. The electronic device as set forth in claim 5, wherein the bending the flexible touch screen two or more times includes at least one of bending the flexible touch screen two or more times in a same direction and bending the flexible touch screen two or more times in different directions.

7. The electronic device as set forth in claim 1, wherein the predefined bending action includes at least one of concavely bending the flexible touch screen and convexly bending the flexible touch screen.

8. The electronic device as set forth in claim 1, wherein the controller allows the flexible touch screen to transition from the lock state to the unlock state when the user bending input corresponds to the predefined bending action and allows the flexible touch screen to remain in the lock state when the user bending input does not correspond to the predefined bending action.

9. The electronic device as set forth in claim 1, wherein the flexible touch screen displays a visual cue for the predefined bending action when operating in the lock state.

10. The electronic device as set forth in claim 1, wherein the flexible touch screen has flexibility and the body part has no flexibility.

11. The electronic device as set forth in claim 1, wherein the flexible touch screen includes a substantially flat shape, and the at least one side of the top surface of the body part is curved.

12. The electronic device as set forth in claim 11, further including a flexible material disposed at the spaced groove.

13. The electronic device as set forth in claim 1, wherein the bending unit senses the user bending input based on a variation of a spaced distance of the thickness direction between the at least one side of the top surface of the body part and the flexible touch screen.

14. The electronic device as set forth in claim 1, wherein the at least one side of the top surface of the body part is spaced apart from the flexible touch screen in at least one of a width direction and a length direction.

15. The electronic device as set forth in claim 14, wherein the at least one side of the top surface of the body part is curved, and at least one side of the flexible touch screen corresponding to the at least one side of the top surface of the body part is curved along the at least one side of the top surface of the body part.

16. The electronic device as set forth in claim 15, further including a flexible material disposed at the spaced groove.

17. The electronic device as set forth in claim 15, wherein the bending unit senses the user bending input based on variation of a spaced distance of at least one of the width direction and the length direction between the at least one side of the top surface of the body part and the at least one side of the flexible touch screen.

* * * * *